Oct. 10, 1961        H. W. WILSON        3,003,283

MEANS FOR COLLECTING PITCH FROM A TREE

Filed Oct. 22, 1959

INVENTOR
HARRY W. WILSON
BY
ATTORNEY

United States Patent Office 3,003,283
Patented Oct. 10, 1961

3,003,283
MEANS FOR COLLECTING PITCH FROM A TREE
Harry W. Wilson, 2 Flower Road, Garden City, N.Y.
Filed Oct. 22, 1959, Ser. No. 847,977
2 Claims. (Cl. 47—11)

This invention relates to means for collecting pitch or gum from a tree and, although it pertains mainly to naval stores, it is also applicable to the collection of latex and similar materials derived from cupping and bleeding of trees. For illustrative purposes only, the invention will be described solely in terms of naval stores.

More particularly, however, the invention provides an apron, made preferably of molded plastics, said apron being adapted to be mounted on a tree with a minimum of fastening elements, said apron being provided with its own guide or gutter members, and means for hanging a collecting cup from said apron, said collecting cup being also made preferably of plastics. In the preferred form of this invention, only two nails are used to secure a single apron to a tree and a supporting bracket is provided on said apron to carry a collecting cup so that no additional supporting means would be required to attach said collecting cup to the tree.

The so-called naval stores, primarily turpentine and rosin are produced by bleeding pine trees by cutting the tree and allowing the pitch from the cut to drip into containers. It is preferable to have director or guide elements, sometimes called gutters, to guide the drippings into the cup, as the cuts are relatively long.

Collecting means of the prior art generally comprise metal cups and director elements which are separately mounted on the tree, for instance with a plurality of nails. The prior system has several disadvantages. The metal cups, for instance, tin or galvanized iron, are affected by acids and become discolored and corroded which contaminates the collected gum and it affects the purity and price of the products.

Also, the prior collecting means generally involve nailing the cup and at least two directors or gutters separately to the tree. The present invention greatly reduces the labor involved which is the greatest cost factor in the production of these products. The prior method is also subject to the fact that the directors may be improperly located with respect to the cup or one or more of them may become displaced and fall off of the tree causing a loss of the drippings.

Another disadvantage of the prior method was the use of many nails. After their usefulness is over as far as the naval stores, these trees are generally cut down and made into wood pulp for various purposes such as paper making, and many nails remaining in the tree cause a great deal of difficulty and result in damage to the pulp and paper making machines. The present invention only uses two nails for the apron, both of the director elements and the cup.

More specifically the present invention provides an apron member which is curved and flexible to fit tightly against the tree and which is adapted to be affixed tightly to the tree with two nails. A pair of director or guide elements extend at substantially a right angle to the apron member and they are tilted or curved down towards the center and they are separated from each other so that the drippings will fall into a cup. The cup is adapted to be hung onto the apron member with a holding bracket and no further nails are required. Therefore, the cup of the present invention may be easily removed for emptying without pulling any nails.

Both the apron member and the cup of the present invention are made of a molded polyethylene which is chemically inert and which is not affected by acids in the product or which may be used to treat the trees. The present cup is not subject to corrosion and will not chemically react to the gum or contaminate it.

Accordingly, a principal object of the invention is to provide new and improved means for collecting pitch from trees.

Another object of the invention is to provide new and improved means for collecting pitch from trees which will not react chemically with the collected drippings and which will not corrode or rust.

Another object of the invention is to provide new and improved collecting means for pitch which are rigid and rugged and substantially unbreakable yet light in weight.

Another object of the invention is to provide new and improved collecting means which are flexible to fit tightly on the surface of a tree and which has a smooth seamless cup to facilitate emptying.

Another object of the invention is to provide new and improved pitch collecting means which are easy to install and require a minimum of nails and labor.

These and other objects of the invention will be apparent from the following specification and drawings, in which.

Figure 1:
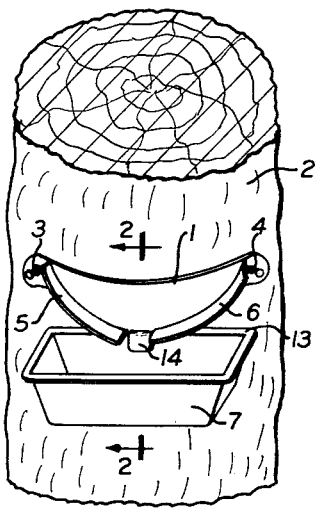
FIGURE 1 is a perspective view of an embodiment of the invention illustrating the use thereof.

Referring now to the figures, the invention generally comprises an apron member 1 which is adapted to be nailed to the tree by means of the nails 3 and 4 which are inserted through preformed holes in the apron member. The nails are preferably of the double headed type which extend out after they have been hammered in so as to permit easy removal.

The apron member is preferably molded of polyethylene or equivalent which is available under a number of trade names. A pair of curved director members 5 and 6 are molded as a part of the apron member 1 and they extend out from the member 1 at substantially 90°. The director members are curved downwardly toward each other at the center of the member 1 and there is a spacing between them so that drippings falling down from a cut in the tree previously made above the collector will be directed by the guide or director elements 5 and 6 into the collecting cup 7 which is mounted on the apron member 1.

Figure 2:
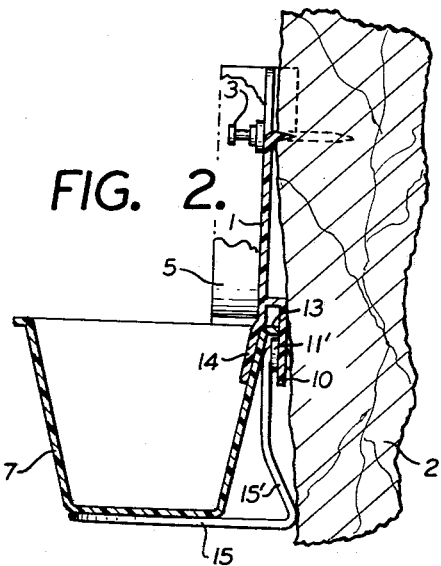
FIGURE 2 is a sectional view taken along the line 2—2 of FIGURE 1.
Figure 3:
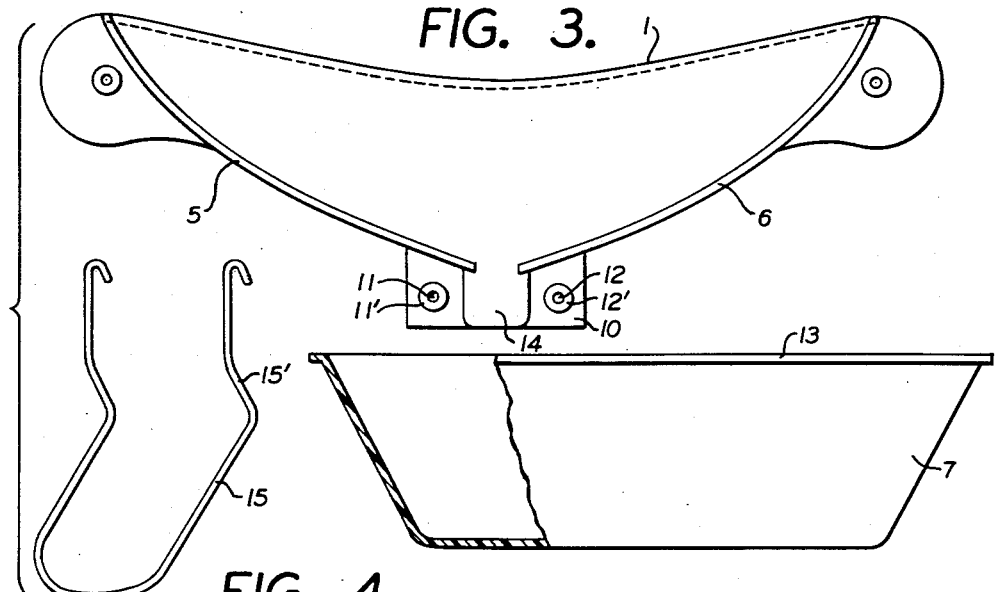
FIGURE 3 is an exploded view illustrating the different elements of the embodiment of FIGURE 1.

Referring to FIGURES 2 and 3, the apron member 1 has an extension 10 at its lower center portion which contains a pair of mounting holes 11 and 12 surrounded by raised portions 11' and 12' which serve to strengthen the mounting holes and also provide support for the lip 13 of the cup when it is attached to the apron member. There is also a lower front flap 14 connected to the apron member which is adapted to fit inside the cup when the cup is attached as shown in FIGURE 2. A metal wire bracket 15 is mounted in the mounting holes 11 and 12 and extends underneath the cup 7. The bracket 15 has a bent portion 15' which extends towards the tree trunk and assists in supporting the cup 7 in a horizontal position.

Therefore, the cup 7 may be easily inserted and removed since the folding flap 14 is flexible. The cup does not require any extra and separate mounting or nails and is automatically located properly with respect to the director elements. Both the apron member and the cup are formed of polyethylene which is rugged, light in weight, and flexible. The apron member is installed by holding it against the tree trunk and securing it thereto with the two nails 3 and 4. The apron member, being flexible, will automatically fit closely to the tree trunk no matter what the size of the tree, thereby eliminating any space between the apron and the tree trunk which would permit loss of the drippings.

Figure 4:
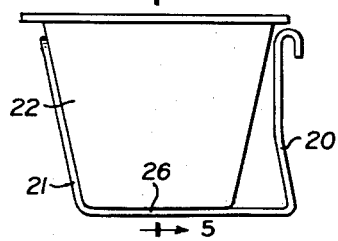
FIGURE 4 is a side view illustrating a modification of the invention.
Figure 5:
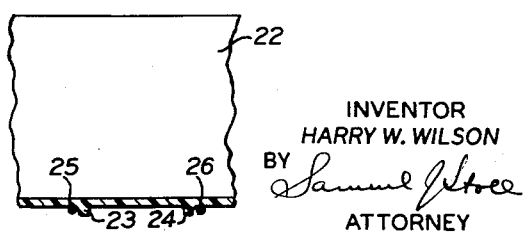
FIGURE 5 is a sectional view along the line 5—5 of FIGURE 4.

FIGURES 4 and 5 show another modification showing a bracket 20 which has an upward extending lip 21 which is adapted to fit against the side of the cup 22. Referring to FIGURE 5, the cup 22 has a pair of extensions or ribs 23 and 24 which are adapted to fit inside the bracket members 25 and 26 which will prevent the cup from slipping off the bracket.

Therefore, the present invention provides unitary collecting means which eliminates the labor cost of mounting separate directors and cups and which also automatically locates the directors with respect to the cup so that very unskilled labor can be used. Since labor is practically the only cost of any consequence, this is an important feature. In addition, the use of only two nails greatly cuts the labor and also minimizes the danger that nails left in the trees will damage the paper making machinery at some later time. The labor cost is not only in the initial installation since these collectors are moved on the tree periodically. The cup of the present invention is flexible yet substantially unbreakable and may also be colored. Different colors, for instance, may be used for classifying the products from different types of trees and so forth. Also, the cup of the present invention has no seams such as a metal cup would have. This is important as the gum must be scraped out of the cups and if there are any seams in the cup, the gum tends to collect and harden on the seams greatly increasing the labor cost. The cup of the present invention also has a waxy surface so that the gum will not adhere to it as it would to metal. More important, the cup and apron are chemically inert with respect to the drippings so that the turpentine and rosin collected will be of maximum purity and will, therefore, bring the greatest price. The present invention has other uses, for instance, in the rubber industry or any other application where drippings are collected from a relatively wide cut or source.

Many modifications may be made by those desiring to practice the invention without departing from the scope thereof, which is set forth in the following claims.

I claim:
1. Means for cupping a tree to collect pitch, gum and other materials bled therefrom, comprising a flexible apron adapted to fit snugly against the tree, gutter elements provided on said apron, supporting means secured to said apron, a collecting cup carried by said supporting means, said gutter elements being adapted to direct the drippings from said tree into said collecting cup, said supporting means comprising a wire bracket pivotally hooked to the apron and adapted to pivot against the tree under the weight of the collecting cup and its contents, said bracket having a laterally supporting arm on which the collecting cup rests and said supporting arm being disposed in a substantially horizontal plane when the bracket abuts the tree under the weight of said collecting cup and its contents, a lip being provided on the apron for engagement with said collecting cup to hold it securely on said supporting arm of the bracket.

2. Cupping means in accordance with claim 1 wherein the lip on the apron which holds the collecting cup on the supporting arm of the bracket is disposed between the gutter elements of said apron and comprises a chute for the drippings from the tree, conveying said drippings into the collecting cup.

References Cited in the file of this patent
UNITED STATES PATENTS

| | | |
|---|---|---|
| 1,051,981 | Breeden | Feb. 4, 1913 |
| 1,061,278 | Fillingim | May 13, 1913 |
| 1,283,878 | Orvin | Nov. 5, 1918 |
| 1,783,650 | Huxford | Dec. 2, 1930 |

FOREIGN PATENTS

| | | |
|---|---|---|
| 757,500 | France | Oct. 9, 1933 |
| 629,346 | Germany | Apr. 28, 1936 |

OTHER REFERENCES

Parliman: "Polyethylene Permeability," published July 1948 in Modern Packaging (magazine), volume 21, No. 11, pages 198, 199, 200, 201, 240.

Parliman: "Polyethylene Permeability, II," published March 1949 in Modern Packaging (magazine), volume 22, No. 7, pages 119 through 122.

Condensed Chemical Dictionary, fifth edition, published by Reinhold (N.Y.), 1956, pages 871, 879, 880, 941 relied on.

Chemical Abstracts, volume 50, published 1956, column 4551, article "Permeability of Polyethylene."